(12) United States Patent
Nakamura et al.

(10) Patent No.: US 11,420,134 B2
(45) Date of Patent: Aug. 23, 2022

(54) MASTER REPRODUCTION APPARATUS, SLAVE REPRODUCTION APPARATUS, AND EMISSION METHODS THEREOF

(71) Applicant: SONY CORPORATION, Tokyo (JP)

(72) Inventors: Hidekazu Nakamura, Tokyo (JP); Yiping Shi, Tokyo (JP); Kohei Katou, Tokyo (JP)

(73) Assignee: SONY CORPORATION, Tokyo (JP)

(*) Notice: Subject to any disclaimer, the term of this patent is extended or adjusted under 35 U.S.C. 154(b) by 76 days.

(21) Appl. No.: 16/471,724

(22) PCT Filed: Jan. 15, 2018

(86) PCT No.: PCT/JP2018/000777
§ 371 (c)(1),
(2) Date: Jun. 20, 2019

(87) PCT Pub. No.: WO2018/154996
PCT Pub. Date: Aug. 30, 2018

(65) Prior Publication Data
US 2019/0380190 A1 Dec. 12, 2019

(30) Foreign Application Priority Data
Feb. 24, 2017 (JP) .............................. JP2017-033490

(51) Int. Cl.
*A63J 17/00* (2006.01)
*G10L 25/51* (2013.01)
(Continued)

(52) U.S. Cl.
CPC .............. *A63J 17/00* (2013.01); *G10L 25/51* (2013.01); *H05B 47/12* (2020.01); *H04W 4/80* (2018.02);
(Continued)

(58) Field of Classification Search
None
See application file for complete search history.

(56) References Cited

U.S. PATENT DOCUMENTS 4,185,276 A * 1/1980 Benson .................... A63J 17/00
340/815.46
5,329,431 A * 7/1994 Taylor ................ G05B 19/0421
362/85
(Continued)

FOREIGN PATENT DOCUMENTS

CN 101662691 A 3/2010
CN 103179475 A 6/2013
(Continued)

OTHER PUBLICATIONS

International Search Report and Written Opinion of PCT Application No. PCT/JP2018/000777, dated Apr. 10, 2018, 09 pages of ISRWO.

(Continued)

*Primary Examiner* — Srinivas Sathiraju
(74) *Attorney, Agent, or Firm* — Chip Law Group

(57) ABSTRACT

A master reproduction apparatus is a master reproduction apparatus capable of executing synchronous reproduction of audio data together with one or more slave reproduction apparatuses. The master reproduction apparatus includes a plurality of light emitting elements, a generation unit, a transmission unit, and a light emission control unit. The generation unit that generates illumination information, in which light emission modes are associated with the plurality of light emitting elements, on the basis of analysis data obtained by analyzing audio data. The transmission unit that transmits the generated illumination information to the one or more slave reproduction apparatuses. The light emission control unit that causes the plurality of light emitting ele- (Continued)

ments to emit light in the light emission modes based on the illumination information.

10 Claims, 5 Drawing Sheets

(51) Int. Cl.
*H05B 47/12* (2020.01)
*H04W 4/80* (2018.01)
*H05B 45/20* (2020.01)
*H05B 47/10* (2020.01)
*H05B 47/165* (2020.01)

(52) U.S. Cl.
CPC .............. *H05B 45/20* (2020.01); *H05B 47/10* (2020.01); *H05B 47/165* (2020.01)

(56) References Cited

U.S. PATENT DOCUMENTS

| | | | | |
|---|---|---|---|---|
| 5,769,527 | A * | 6/1998 | Taylor | H05B 47/12 362/85 |
| 6,166,496 | A * | 12/2000 | Lys | H05B 47/18 315/316 |
| 6,211,626 | B1 * | 4/2001 | Lys | H05B 45/3725 315/291 |
| 6,813,777 | B1 * | 11/2004 | Weinberger | H04B 7/18508 348/E5.008 |
| 7,227,075 | B2 * | 6/2007 | Chang | G10H 1/0008 340/815.46 |
| 7,459,623 | B2 * | 12/2008 | Robertson | A63J 17/00 340/815.46 |
| 7,809,448 | B2 * | 10/2010 | Lys | H05B 47/155 700/12 |
| 7,924,174 | B1 * | 4/2011 | Gananathan | H05B 47/155 340/999 |
| 8,964,298 | B2 * | 2/2015 | Haddick | H04N 7/15 359/630 |
| 9,072,133 | B2 * | 6/2015 | Chemel | F21S 2/005 |
| 9,288,088 | B1 * | 3/2016 | McIlroy | H04L 25/40 |
| 9,860,961 | B2 * | 1/2018 | Chemel | F21V 23/0442 |
| 10,021,764 | B2 * | 7/2018 | Pisani | H05B 47/12 |
| 10,049,663 | B2 * | 8/2018 | Orr | G10L 15/1815 |
| 10,733,993 | B2 * | 8/2020 | Kudurshian | G06F 3/167 |
| 2002/0038157 | A1 * | 3/2002 | Dowling | H05B 47/12 700/90 |
| 2004/0052076 | A1 * | 3/2004 | Mueller | G02B 27/0994 362/293 |
| 2007/0086754 | A1 * | 4/2007 | Lys | H05B 47/155 386/231 |
| 2010/0296285 | A1 * | 11/2010 | Chemel | F21V 14/02 362/235 |
| 2012/0306381 | A1 * | 12/2012 | Adler | H05B 31/50 315/152 |
| 2013/0002144 | A1 * | 1/2013 | Adler | F21S 2/00 315/153 |
| 2013/0272535 | A1 * | 10/2013 | Yuan | H04R 1/026 381/77 |
| 2013/0279706 | A1 * | 10/2013 | Marti | G06F 3/165 381/57 |
| 2014/0001959 | A1 * | 1/2014 | Motley | H05B 45/30 315/149 |
| 2014/0070729 | A1 * | 3/2014 | Sako | H05B 47/175 315/307 |
| 2014/0285090 | A1 * | 9/2014 | Chemel | F21V 21/15 315/131 |
| 2014/0285095 | A1 * | 9/2014 | Chemel | H05B 47/155 315/152 |
| 2014/0294202 | A1 * | 10/2014 | Molinie | H05B 47/19 381/107 |
| 2014/0355246 | A1 * | 12/2014 | Yotsumoto | F21K 9/23 362/86 |
| 2015/0042240 | A1 * | 2/2015 | Aggarwal | H05B 47/19 315/292 |
| 2015/0043425 | A1 * | 2/2015 | Aggarwal | H05B 47/19 370/328 |
| 2015/0043426 | A1 * | 2/2015 | Aggarwal | H05B 47/175 370/328 |
| 2015/0358707 | A1 * | 12/2015 | Saijo | G10H 1/40 381/386 |
| 2016/0007115 | A1 * | 1/2016 | Kouthoofd | H04R 3/12 381/77 |
| 2016/0091217 | A1 * | 3/2016 | Verberkt | H05B 47/135 700/276 |
| 2016/0273726 | A1 * | 9/2016 | Adler | H04L 12/2803 |
| 2017/0108236 | A1 * | 4/2017 | Guan | H05B 47/105 |
| 2017/0171946 | A1 * | 6/2017 | Pisani | H05B 45/20 |
| 2018/0063924 | A1 * | 3/2018 | Alfier | G06T 19/006 |
| 2018/0158460 | A1 * | 6/2018 | Lee | H05B 47/12 |
| 2019/0380190 | A1 * | 12/2019 | Nakamura | G10L 25/51 |
| 2020/0060007 | A1 * | 2/2020 | Harrison | G06T 15/08 |

FOREIGN PATENT DOCUMENTS

| | | |
|---|---|---|
| CN | 103677796 A | 3/2014 |
| CN | 104024724 A | 9/2014 |
| CN | 109716783 A | 5/2019 |
| EP | 2797338 A1 | 10/2014 |
| EP | 2803900 A1 | 11/2014 |
| EP | 3518552 A1 | 7/2019 |
| JP | 2007-073438 A | 3/2007 |
| JP | 2008-147860 A | 6/2008 |
| JP | 2009-224822 A | 10/2009 |
| JP | 2014-053180 A | 3/2014 |
| JP | 2015-508590 A | 3/2015 |
| WO | 2013/091330 A1 | 6/2013 |
| WO | 2013/105169 A1 | 7/2013 |
| WO | 2014/103118 A1 | 7/2014 |
| WO | 2015/092984 A | 6/2015 |
| WO | 2016/103546 A1 | 6/2016 |

OTHER PUBLICATIONS

Office Action for CN Patent Application No. 201880005263.8 dated Sep. 1, 2020, 14 pages of Office Action and 27 pages of English Translation.

Office Action for JP Patent Application No. 2019-501112, dated Oct. 5, 2021, 03 pages of English Translation and 03 pages of Office Action.

* cited by examiner

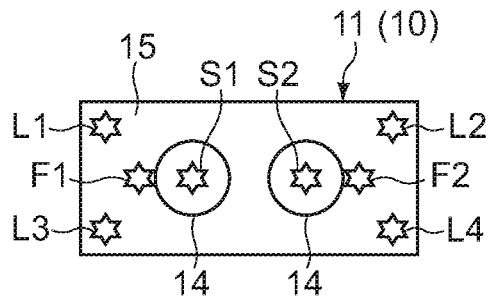

L1: Full color (RGB)
L2: Full color (RGB)
L3: Full color (RGB)
L4: Full color (RGB)
F1: Single color
F2: Single color
S1: Full color (RGB)
S1: Full color (RGB)

FIG. 2A

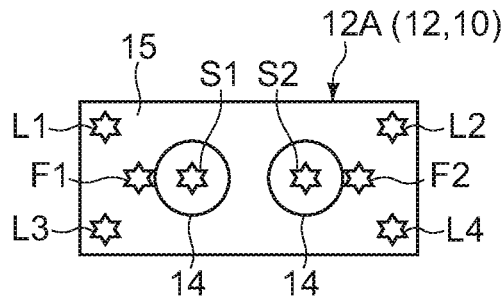

L1: Full color (RGB)
L2: Full color (RGB)
L3: Full color (RGB)
L4: Full color (RGB)
F1: Single color
F2: Single color
S1: Full color (RGB)
S1: Full color (RGB)

FIG. 2B

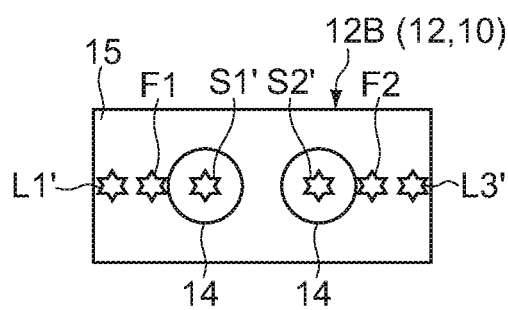

L1': Full color (RGB)
L3': Full color (RGB)
F1: Single color
F2: Single color
S1': Single color
S2': Single color

FIG. 2C

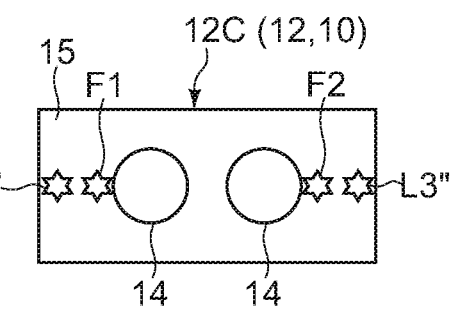

L1": Single color
L3": Single color
F1: Single color
F2: Single color

FIG. 2D

| L1 | | | L2 | | | L3 | | | L4 | | | F1 | F2 | S1 | | | S2 | | |
|---|---|---|---|---|---|---|---|---|---|---|---|---|---|---|---|---|---|---|---|
| R | G | B | R | G | B | R | G | B | R | G | B | Brightness | Brightness | R | G | B | R | G | B |

FIG.5

| L1 | L2 | L3 | L4 | F1 | F2 | S1 | S2 | Color |
|---|---|---|---|---|---|---|---|---|
| Pt.No | Pt.No | Pt.No | Pt.No | Pt.No | Pt.No | Pt.No | Pt.No | Col-Tbl.No |

FIG.6

MASTER REPRODUCTION APPARATUS, SLAVE REPRODUCTION APPARATUS, AND EMISSION METHODS THEREOF

CROSS REFERENCE TO RELATED APPLICATIONS

This application is a U.S. National Phase of International Patent Application No. PCT/JP2018/000777 filed on Jan. 15, 2018, which claims priority benefit of Japanese Patent Application No. JP 2017-033490 filed in the Japan Patent Office on Feb. 24, 2017. Each of the above-referenced applications is hereby incorporated herein by reference in its entirety.

TECHNICAL FIELD

The present technology relates to a technology for synchronously reproducing audio data with a plurality of reproduction apparatuses and for causing light emitting elements provided in the apparatuses to emit light.

BACKGROUND ART

Conventionally, there is known a system in which a home network is built in a home and the content, such as music or a video, is reproduced by a reproduction apparatus connected thereto. For example, Patent Literature 1 describes a control method for multi-room reproduction in which a group is configured by a plurality of reproduction apparatuses connected to a network and the same content is synchronously reproduced (refer to specification paragraphs [0043] to [0046] and FIG. 8).

Patent Literature 2 describes a sound reproduction apparatus including a lighting device. In this sound reproduction apparatus, reproduced audio data is analyzed. In accordance with the analysis result, the light emission timing, brightness, and the like of the lighting device are appropriately controlled. Since this makes it possible to enjoy the reproduction of audio content not only acoustically but also visually, it is possible to experience high excitement or uplifting (refer to specification paragraphs [0026] to [0041]).

CITATION LIST

Patent Literature

Patent Literature 1: International Publication WO2016/103546
Patent Literature 2: International Publication WO2014/103118

DISCLOSURE OF INVENTION

Technical Problem

Also in the future, it is thought that audio data reproduction technologies using a plurality of reproduction apparatuses will continue to spread. Therefore, it is required to provide products or services that users can enjoy more.

It is an object of the present disclosure to provide a master reproduction apparatus, a slave reproduction apparatus, and reproduction methods thereof for improving user's excitement.

Solution to Problem

In order to achieve the aforementioned object, a master reproduction apparatus according to an aspect is a master reproduction apparatus capable of executing synchronous reproduction of audio data together with one or more slave reproduction apparatuses.

The master reproduction apparatus includes a plurality of light emitting elements, a generation unit, a transmission unit, and a light emission control unit.

The generation unit is configured to generate illumination information, in which light emission modes are associated with the plurality of light emitting elements, on the basis of analysis data obtained by analyzing audio data.

The transmission unit is configured to transmit the generated illumination information to the one or more slave reproduction apparatuses.

The light emission control unit is configured to cause the plurality of light emitting elements to emit light in the light emission modes based on the illumination information.

The master reproduction apparatus having a plurality of light emitting elements controls light emission individually for each of the light emitting elements on the basis of the illumination information, and transmits the illumination information to one or more slave reproduction apparatuses. Therefore, the master reproduction apparatus can reproduce audio data in synchronization with the slave reproduction apparatuses and perform light emission according to the audio data. As a result, the user's excitement is improved.

The slave reproduction apparatus may have at least one light emitting element. The master reproduction apparatus may further include a light emission control command generation unit configured to generate a light emission control command for synchronizing light emission by the plurality of light emitting elements with light emission by the light emitting element of the slave reproduction apparatus. The transmission unit may be configured to transmit the generated light emission control command to the slave reproduction apparatus.

Therefore, the master reproduction apparatus can cause the light emitting elements to emit light in synchronization with the slave reproduction apparatus.

At least one of the one or more slave reproduction apparatuses may be a heterogeneous slave reproduction apparatus having one or more light emitting elements configured to differ in at least one of the number, arrangement, or functional levels of the plurality of light emitting elements of the master reproducing apparatus. The transmission unit may be configured to transmit the illumination information to the heterogeneous slave reproduction apparatus.

The master reproduction apparatus transmits the same illumination information as the illumination information used by itself to the heterogeneous slave reproduction apparatus. Even though the heterogeneous slave reproduction apparatus has light emitting elements the number of which or whose functional levels are different from those of the light emitting elements of the master reproduction apparatus, the heterogeneous slave reproduction apparatus executes light emission control using the illumination information.

The generation unit may be configured to generate illumination information, in which a color value is associated with a first light emitting element among the plurality of light emitting elements and a brightness value is associated with a second light emitting element, as the light emission mode of the illumination information.

Therefore, the master reproduction apparatus can realize various illuminations using a plurality of light emitting elements.

The generation unit may be configured to generate illumination information, which includes a light emission pattern associated with each of the plurality of light emitting elements and a color table defining a combination of a plurality of color values, as the light emission mode of the illumination information.

Therefore, the master reproduction apparatus can realize more various illuminations by using the plurality of light emitting elements as compared with the illumination information in which the above-described color value or brightness value is associated.

The generation unit may be configured to generate illumination information in which a color range of the light emission pattern according to the light emission pattern is defined by a combination of the plurality of color values defined by the color table.

A slave reproduction apparatus according to an aspect is a slave reproduction apparatus capable of executing synchronous reproduction of audio data together with a master reproduction apparatus.

The slave reproduction apparatus includes one or more light emitting elements, a reception unit, and a light emission control unit.

The reception unit is configured to receive audio data and illumination information, which is illumination information generated by the master reproduction apparatus having a plurality of light emitting elements and generated on the basis of analysis data of the audio data and in which light emission modes are associated with the plurality of light emitting elements, from the master reproduction apparatus.

The light emission control unit is configured to cause the one or more light emitting elements to emit light on the basis of the received illumination information.

The master reproduction apparatus having a plurality of light emitting elements controls light emission individually for each of the light emitting elements on the basis of the illumination information, and the slave reproduction apparatus receives the illumination information generated by the master reproduction apparatus. Therefore, the slave reproduction apparatus can reproduce audio data in synchronization with the master reproduction apparatus and cause the one or more light emitting elements to emit light in accordance with the audio data on the basis of the illumination information. As a result, the user's excitement is improved.

The reception unit may be configured to receive a light emission control command transmitted from the master reproduction apparatus, the light emission control command being for synchronizing light emission by the plurality of light emitting elements with light emission by the light emitting elements of the slave reproduction apparatus.

Therefore, the slave reproduction apparatus can cause the light emitting elements to emit light in synchronization with the master reproduction apparatus.

At least one of the number or arrangement of the one or more light emitting elements is different from that of the plurality of light emitting elements of the master reproduction apparatus.

A functional level of at least one of the one or more light emitting elements may be different from a functional level of at least one light emitting element corresponding in advance among the plurality of light emitting elements of the master reproduction apparatus.

The master reproduction apparatus may be configured to generate illumination information, in which information including a color value is associated with at least one of the plurality of light emitting elements, as the light emission mode of the illumination information. The light emission control unit may be configured to convert the color value using a predetermined algorithm to cause at least one of the one or more light emitting elements to emit light.

The slave reproduction apparatus receives the same illumination information as the illumination information used by the master reproduction apparatus. Even if the functional level of one of the light emitting elements of the slave reproduction apparatus is different, the light emission control unit can perform light emission according to the master reproduction apparatus by converting the color value of the master reproduction apparatus without using the color value as it is.

The light emission control unit may be configured to convert the color value into a brightness value.

A light emission method according to an aspect is a light emission method by a master reproduction apparatus capable of executing synchronous reproduction of audio data together with one or more slave reproduction apparatuses.

Audio data is analyzed to generate analysis data.

On the basis of the acquired analysis data, illumination information in which light emission modes are associated with a plurality of light emitting elements provided in the master reproduction apparatus is generated.

The generated illumination information is transmitted to the one or more slave reproduction apparatuses.

The plurality of light emitting elements are made to emit light in the light emission modes based on the illumination information.

A light emission method according to an aspect is a light emission method by a slave reproduction apparatus capable of executing synchronous reproduction of audio data together with a master reproduction apparatus.

Audio data and illumination information, which is illumination information generated by the master reproduction apparatus having a plurality of light emitting elements and generated on the basis of analysis data of the audio data and in which light emission modes are associated with the plurality of light emitting elements, are received from the master reproduction apparatus.

One or more light emitting elements provided in the slave reproduction apparatus are made to emit light on the basis of the received illumination information.

A functional level of at least one of the one or more light emitting elements may be different from functional levels of the plurality of light emitting elements of the master reproduction apparatus. The master reproduction apparatus may be configured to generate illumination information, in which information including a color value is associated with at least one of the plurality of light emitting elements, as the light emission mode of the illumination information. In light emission of the one or more light emitting elements, the color value is converted using a predetermined algorithm to cause at least one of the one or more light emitting elements to emit light.

Advantageous Effects of Invention

As described above, in accordance with the present technology, it is possible to improve the user's excitement.

Note that, the effect described herein is not necessarily limited, and may be any of the effects described in this disclosure.

BRIEF DESCRIPTION OF DRAWINGS

FIGS. 2A, 2B, 2C, and 2D Upper portions of FIGS. 2A, 2B, 2C, and 2D schematically show the configuration of each reproduction apparatus, in particular, the arrangement of light emitting elements. Lower portions of Parts A to D of FIGS. 2A, 2B, 2C, and 2D schematically show the functional levels of light emitting elements provided in these reproduction apparatuses.

FIG. 5 is a table showing illumination information according to Embodiment 1 generated by a master reproduction apparatus.

FIG. 6 is a table showing illumination information according to Embodiment 2 generated by a master reproduction apparatus.

MODE(S) FOR CARRYING OUT THE INVENTION

Hereinafter, embodiments according to the present technology will be described with reference to the diagrams.

1. System Configuration

Figure 1:
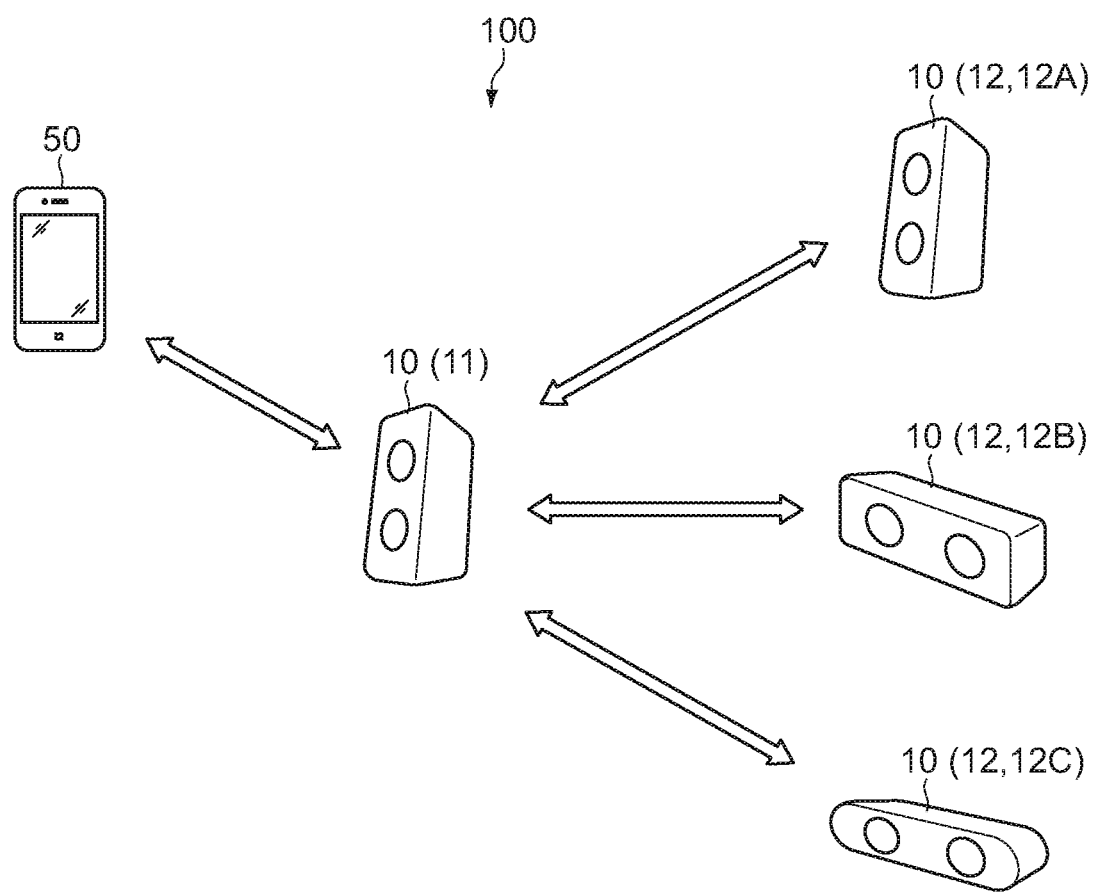
FIG. 1 is a diagram showing the configuration of a reproduction system according to an embodiment of the present technology.

FIG. 1 is a diagram showing the configuration of a reproduction system according to an embodiment of the present technology. This reproduction system 100 includes, for example, a computer 50 and a plurality of reproduction apparatuses 10 capable of reproducing audio data.

The computer 50 is typically a smartphone or a tablet computer. The computer 50 may be of a laptop type or a desktop type.

A plurality of reproduction apparatuses 10 mainly function as speakers. The plurality of reproduction apparatuses 10 include one master reproduction apparatus 11 and one or more slave reproduction apparatuses 12 that can be connected to the master reproduction apparatus 11. In the present embodiment, a plurality of slave reproduction apparatuses 12 can be multi-connected to the master reproduction apparatus 11.

The computer 50 and the master reproduction apparatus 11 can be connected to each other using near field communication. Further, the master reproduction apparatus 11 and the slave reproduction apparatus 12 can also be connected to each other using near field communication. As a standard for near field communication, Bluetooth (registered trademark; the same hereinbelow) is used in the present embodiment. As near field communication, Zigbee may be used instead of Bluetooth.

These apparatuses may be connected to each other by a wireless LAN, such as WiFi, without being limited to the near field communication. The master reproduction apparatus 11 is configured so as to be multi-connectable to the plurality of slave reproduction apparatus 12.

The computer 50 includes a storage (not illustrated) for storing audio data. By operating the computer 50 by the user, the computer 50 can transmit audio data in the storage to the master reproduction apparatus 11, and the master reproduction apparatus 11 can reproduce this. Further, the master reproduction apparatus 11 can transmit the audio data to the slave reproduction apparatus 12 as will be described later, and the slave reproduction apparatus 12 can reproduce the audio data in synchronization with the master reproduction apparatus 11.

2. Reproduction Apparatus 2.1) Configuration on Appearance of Reproduction Apparatus Upper portions of FIGS. 2A, 2B, 2C, and 2D schematically show the configuration of each reproduction apparatus 10, in particular, the arrangement of light emitting elements. Lower portions of FIGS. 2A, 2B, 2C, and 2D schematically show the functional levels of light emitting elements provided in these reproduction apparatuses 10. FIG. 2A shows the master reproduction apparatus 11, and FIGS. 2B, 2C, and 2D show the slave reproduction apparatus 12. The reproduction apparatuses 10 shown in FIGS. 2A, 2B, 2C, and 2D correspond to the reproduction apparatuses 10 shown in FIG. 1.

Each reproduction apparatus 10 includes a housing 15 and a plurality of speaker units 14. A multi-channel type speaker is realized by each speaker unit 14.

The master reproduction apparatus 11 includes, for example, a plurality of light emitting elements L1 to L4, F1, F2, S1, and S2. Each slave reproduction apparatus 12 similarly includes a plurality of light emitting elements.

A slave reproduction apparatus 12A shown in FIG. 2B is the same model as the master reproduction apparatus 11. The models of the master reproduction apparatus 11 and the slave reproduction apparatus 12A will be referred to as first models for convenience of description. The model (second model) of the slave reproduction apparatus 12B shown in FIG. 2C and the model (third model) of the slave reproduction apparatus 12C shown in FIG. 2D are different from the first model. That is, at least one of the plurality of slave reproduction apparatuses 12A to 12C is a heterogeneous slave reproduction apparatus different from the model of the master reproduction apparatus 11.

Specifically, the number of light emitting elements of the second model is smaller than that of the first model, and the functional level of the light emitting elements of the second model is different from that of the first model. Further, the arrangement of some light emitting elements also differs between these models.

The number of light emitting elements of the third model is smaller than that of the second model (and the first model), and the functional level of the light emitting elements of the third model is different from that of the second model (and the first model). Specifically, the functional level of at least one of one or more light emitting elements of the third model is different from the functional level of at least one light emitting element corresponding in advance among the plurality of light emitting elements of the second model (and the first model). This will be described in detail later. Further, the arrangement of some light emitting elements also differs between these models.

One light emitting element is configured to include one or more light emitting diodes (LEDs), for example. Specifically, a point-like, linear, or planar light emitting region is formed by one or more LEDs. The one light emitting region corresponds to one light emitting element. Further, a light guide may also be provided as an associated component of the light emitting element. In FIGS. 2A, 2B, 2C, and 2D, in order to facilitate understanding of the present technology, each light emitting element is schematically drawn as a star. Note that, these light emitting elements may be formed by organic electro-luminescence (EL).

Each light emitting element is disposed at a predetermined position of the housing 15 of the reproduction apparatus 10. For example, in the first model shown in FIGS. 2A and 2B, four light emitting elements L1, L2, L3, and L4 are disposed at the four corners of the housing 15. Two light emitting elements F1 and F2 are disposed adjacent to the speaker unit 14. Then, two light emitting elements S1 and S2 are disposed in the speaker unit 14.

In the slave reproduction apparatus 12B of the second model shown in of FIG. 2C, two light emitting elements L1' and L3' are disposed at the centers of both ends of the housing 15. Two light emitting elements F1 and F2 are disposed adjacent to the speaker unit 14. Then, two light emitting elements S1' and S2' are disposed in the speaker unit 14.

In the slave reproduction apparatus 12C of the third model shown in FIG. 2D, two light emitting elements L1" and L3" are disposed at the centers of both ends of the housing 15. Then, two light emitting elements F1 and F2 are disposed adjacent to the speaker unit 14.

Note that, "L" means a linear light emitting region, "F" means a flash that forms, for example, a point-like light emitting region, and "S" means an arrangement in the speaker unit 14. However, the shape or the arrangement of the light emitting region is not limited to those shown in FIGS. 2A, 2B, 2C, and 2D.

The light emitting elements L1 to L4, L1', and L3' are configured to emit light in full color (for example, RGB values). The light emitting elements L1", L3", F1, F2, S1', and S2' are configured to emit light in, for example, a single color (for example, a white color based single color; however, other colors may be applied). The light emitting elements S1 and S2 are configured to emit light in full color (for example, RGB values).

That is, the functional levels of the light emitting elements S1' and S2' of the second model are lower than those of the light emitting elements S1 and S2. Further, the functional levels of the light emitting elements L1" and L3" of the third model are lower than those of the light emitting elements L1, L2, L3, L4, L1', and L3'.

2.2) System Configuration of Reproduction Apparatus

Figure 3:
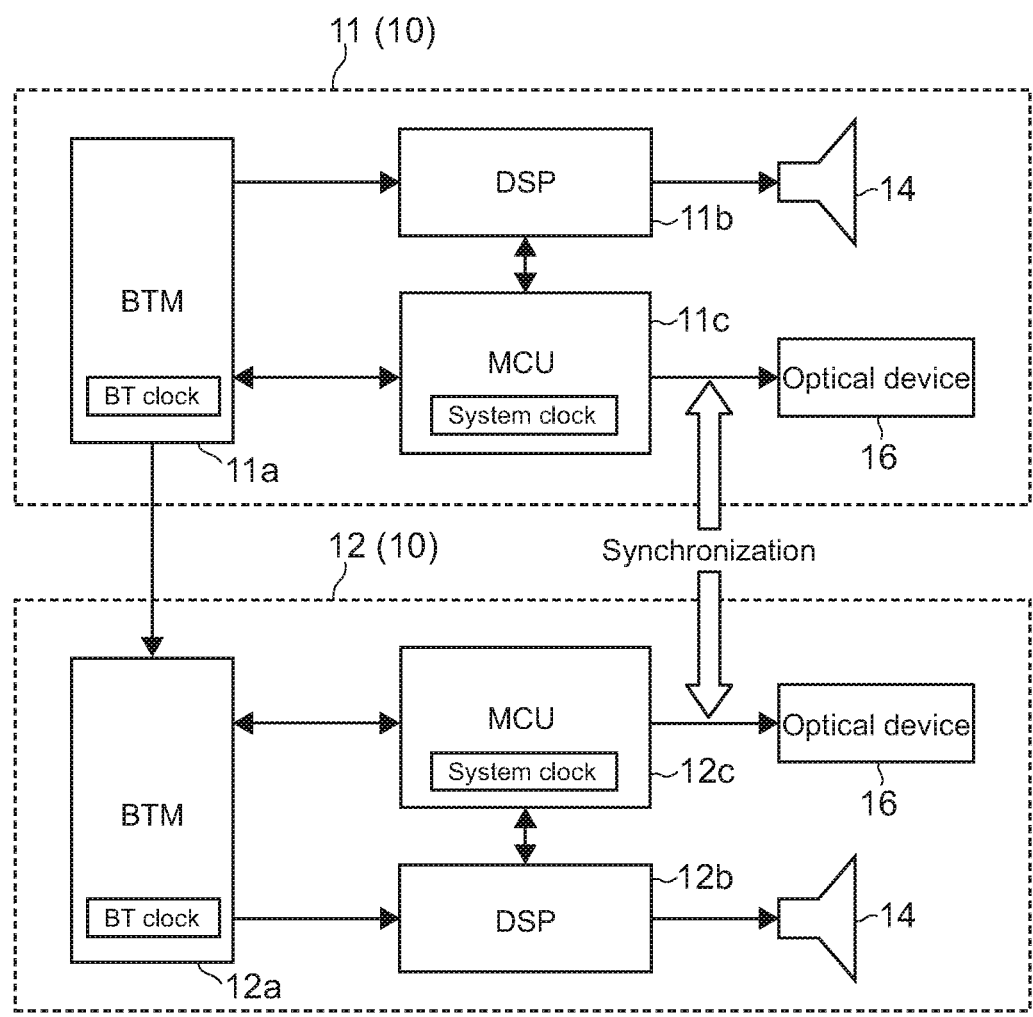
FIG. 3 is a block diagram showing the system configuration of a reproduction apparatus.

FIG. 3 is a block diagram showing the system configuration of the reproduction apparatus 10. The master reproduction apparatus 11 includes a Bluetooth module (BTM) 11a, a digital signal processor (DSP) 11b, a micro controller unit (MCU) 11c, and a light emitting device 16. The slave reproduction apparatus 12 basically has the same configuration as that of the master reproduction apparatus 11.

The master reproduction apparatus 11 and the slave reproduction apparatus 12 have memories such as a random access memory (RAM) and a read only memory (ROM), which are not illustrated, in addition to these components. Programs or data required to realize the operations or functions of the MCUs 11c and 12c is stored in the ROM.

The light emitting device 16 includes a plurality of light emitting elements L1, L2, F1, S1, and the like, a driver for driving these, and the like.

The BTM 11a communicates with a BTM (not illustrated) of the computer 50 (refer to FIG. 1) or a BTM 12a of another reproduction apparatus 10 on the basis of the Bluetooth standard. The BTM 11a mainly performs communication of audio data and data relevant to light emission control. The BTMs 11a and 112a function as a "transmission unit" and/or a "reception unit".

The DSP 11b of the master reproduction apparatus 11 mainly has a function of analyzing the audio data transmitted from the BTM 11a to generate analysis data and outputting the generated analysis data to the MCU 11c. In the present embodiment, the DSP lib performs frequency analysis, in particular, low frequency extraction processing as analysis processing. Further, the DSP lib has a function of outputting audio data to the speaker unit 14 through, for example, a DA converter (not illustrated).

The MCU 11c of the master reproduction apparatus 11 acquires the analysis data from the DSP lib, and generates illumination information on the basis of the analysis data. In this case, the MCU 11c mainly functions as a "generation unit". Specifically, the MCU 11c detects a beat on the basis of data of base components as analysis data. The DSP 11b and the MCU 11c may detect not only the beat but also a tempo, a rhythm, and a key.

Then, the MCU 11c can generate illumination information corresponding to the audio data by generating illumination information on the basis of the information, such as the beat.

The illumination information is information in which the light emission mode is associated with each of the light emitting elements L1 to L4, F1, F2, S1, and S2 of the master reproduction apparatus 11. The MCU 11c has a function of causing the plurality of light emitting elements to emit light in a light emission mode based on the generated illumination information. In this case, the MCU 11c mainly functions as a "light emission control unit".

The MCU 11c outputs the generated illumination information to the BTM 11a. For transmission from the MCU 11c to the BTM 11a, for example, a universal asynchronous receiver transmitter (UART) is used.

Further, the MCU 11c includes a light emission control command generation unit (not illustrated) that generates a light emission control command for controlling light emission in synchronization with the slave reproduction apparatus 12. The MCU 11c transmits the generated light emission control command to the slave reproduction apparatus 12 through the BTM 11a. In this manner, synchronous light emission by the respective light emitting elements is realized between the master reproduction apparatus 11 and one or more slave reproduction apparatuses 12.

The MCU 11c further generates a reproduction control command for reproducing the audio data in synchronization with the slave reproduction apparatus 12. The MCU 11c transmits the generated reproduction control command to the slave reproduction apparatus 12 through the BTM 11a. In this manner, synchronous reproduction of audio data is realized between the master reproduction apparatus 11 and one or more slave reproduction apparatuses 12. The MCU 11c can realize synchronous reproduction by a known method using means, such as a system clock, a counter, and frequency control.

The MCU 11c can transmit data including the illumination information, the light emission control command, and the reproduction control command described above, which serves as a header portion, and audio data, which serves as a data portion, to the slave reproduction apparatus 12 in a packet format.

Alternatively, the MCU 11c transmits the illumination information and/or the light emission control command to the slave reproduction apparatus 12 independently of the audio data. In this case, the MCU 11c transmits data to be synchronized with audio data in a state in which the data to be synchronized with audio data is included in the illumination information and/or the light emission control command.

The BTM 12a of the slave reproduction apparatus 12 receives the illumination information, the light emission control command, the reproduction control command, and the audio data from the master reproduction apparatus 11. The MCU 12c (or the DSP 12b) outputs the audio data to the speaker unit 14 in synchronization with the master reproduction apparatus 11. Further, the MCU 12c controls light emission of its own light emitting element on the basis of the illumination information and the light emission control command.

3. Light Emission Synchronization Control

Figure 4:
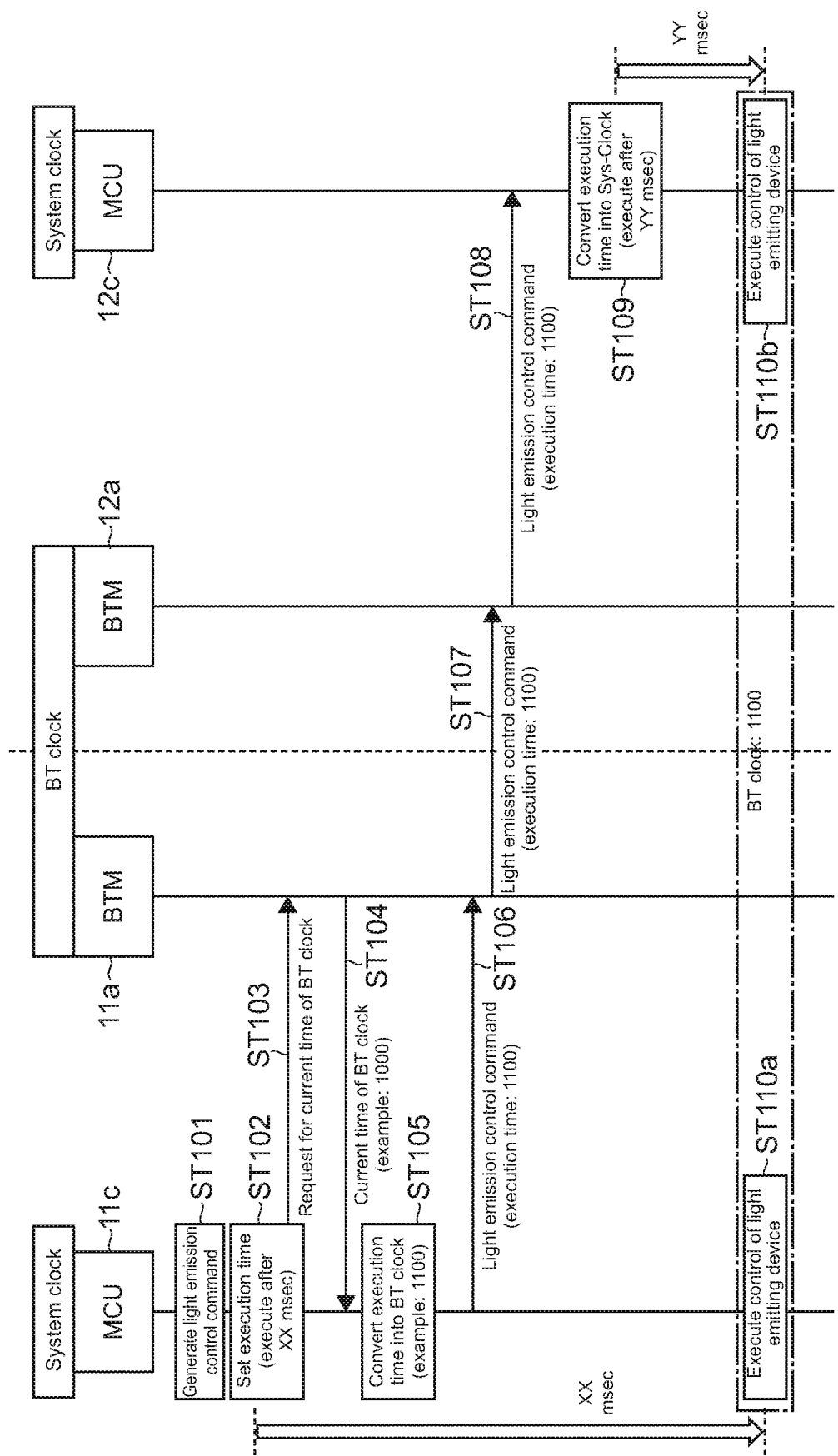
FIG. 4 is a diagram showing a sequence of synchronization control of light emission by a master reproduction apparatus and a slave reproduction apparatus.

FIG. 4 is a diagram showing a sequence of synchronization control of light emission by the master reproduction apparatus 11 and the slave reproduction apparatus 12.

The MCU 11c of the master reproduction apparatus 11 generates a light emission control command (step 101). As a result, for example, a timer for starting the execution of light emission control after XX msec is set by the system clock of the MCU 11c (step 102). The MCU 11c sends a request for the current time of the clock (BT clock) of the BTM 11a (step 103). The BTM clock transmits the current time of the BT clock to the MCU 11c in response to the request (step 104). The current time of the BT clock is set to, for example, "1000".

The MCU 11c converts the light emission control execution time (start time) set in step 102 into a BT clock (step 105). For example, the BT clock after conversion is set to "1100". The MCU 11c transmits the generated light emission control command (execution time 1100) to the BTM 11a (step 106), and the BTM 11a transmits the light emission control command (execution time 1100) to the BTM 12a of the slave reproduction apparatus 12 (step 107).

The BTM 12a of the slave reproduction apparatus 12 transmits the light emission control command to the MCU 12c (step 108). Then, the MCU 12c converts the light emission control execution time into a system clock, and sets the light emission control execution time after YY msec (step 109).

As a premise of this sequence, when the master reproduction apparatus 11 and the slave reproduction apparatus 12 are connected to each other by near field communication, the system clocks of the MCUs 11c and 12c are in synchronization with each other. Therefore, after step 109, the master reproduction apparatus 11 and the slave reproduction apparatus 12 can simultaneously execute light emission control at the time 1100 (steps 110a and 110b).

4. Embodiment for Light Emission Control 4.1) Embodiment 1

FIG. 5 is a table showing illumination information according to Embodiment 1 generated by the master reproduction apparatus 11. The illumination information is information indicating the light emission mode associated with each of the light emitting elements as described above.

In the example of the illumination information, color values (RGB values) are set in the light emitting elements (first light emitting elements) L1 to L4, S1, and S2 that can emit light in full color. Brightness values are set in the light emitting elements (second light emitting elements) F1 and F2 that can emit light in a single color. The color values and the brightness values are set by a predetermined algorithm on the basis of a beat detected by beat detection based on analysis data or a tempo, a rhythm, and a key detected on the basis of analysis data.

The master reproduction apparatus 11 transmits the illumination information to the slave reproduction apparatus 12. The transmission interval is a predetermined time unit. The time unit is, for example, 30 msec to 200 msec.

The slave reproduction apparatus 12 receives the illumination information. Then, the MCU 12c of the slave reproduction apparatus 12 assigns the illumination information to each corresponding light emitting element that the MCU 12c itself has, so that the light emitting element emits light. The slave reproduction apparatus 12 causes the light emitting element to emit light on the basis of the illumination information every time the illumination information is received, that is, for each time unit described above. Specifically, the slave reproduction apparatuses 12B and 12C of the second and third models execute light emission control as follows.

4.1.1) Light Emission Control of Slave Reproduction Apparatus 12A of First Model The number, arrangement, and functional levels of light emitting elements of the slave reproduction apparatus 12A (refer to FIG. 2A) of the first model are all the same as those of the master reproduction apparatus 11. Therefore, the slave reproduction apparatus 12A of the first model assigns the illumination information to its own light emitting element as it is, and controls the light emission in the same light emission mode as in the master reproduction apparatus 11. The same applies to Embodiment 2 to be described later.

4.1.2) Light Emission Control of Slave Reproduction Apparatus 12B of Second Model On the other hand, the number, arrangement, and functional levels of light emitting elements of the slave reproduction apparatus 12B (refer to FIG. 2C) of the second model are different from those of the master reproduction apparatus 11. For example, the light emitting elements L1 and L3 and the light emitting elements L1' and L3' of the master reproduction apparatus 11 are disposed differently, but the light emitting elements L1 and L3 are assigned to the light emitting elements L1' and L3', respectively. This assignment is determined in advance. That is, the light emitting element L1' corresponds to L1, and the light emitting element L3' corresponds to L3. Then, the MCU 12c of the slave reproduction apparatus 12B generates illumination information by associating the data (color values) of the light emission modes of the light emitting elements L1 and L3 with L1' and L3'.

Further, in the slave reproduction apparatus 12B of the second model, the light emitting elements S1 and S2 of the master reproduction apparatus 11 are assigned to the light emitting elements S1' and S2', respectively. The arrangement of the light emitting elements S1 and S2 and the arrangement of the light emitting elements S1' and S2' are the same between these models, but the functional levels of S1' and S2' are single color and are different from the functional levels of S1 and S2. In this case, the MCU 12c of the slave reproduction apparatus 12B generates illumination information by converting the color values of S1 and S2 of the received illumination information into brightness values using a predetermined algorithm and associating the brightness values as light emission modes of the light emitting elements S1' and S2'.

An example of a conversion equation from a color value to a brightness value is shown in the following Equation 1.

$$\text{Brightness value} = 0.299R + 0.587G + 0.114B \quad \text{(Equation 1)}$$

Further, the illumination information is generated such that the light emission modes of the light emitting elements F1 and F2 of the master reproduction apparatus 11 are associated with the light emitting elements F1 and F2 of the slave reproduction apparatus 12B of the second model as they are. Since the slave reproduction apparatus 12B does not have light emitting elements corresponding to the light emitting elements L2 and L4 of the master reproduction apparatus 11, the light emission modes of the light emitting elements L2 and L4 are excluded or neglected.

As described above, the MCU 12c of the slave reproduction apparatus 12B updates the illumination information as described above on the basis of the illumination information received from the master reproduction apparatus 11, and executes the light emission control of the light emitting element on the basis of this. In this case, the MCU 12c functions as a "light emission control unit".

4.1.3) Light Emission Control of Slave Reproduction Apparatus 12C of Third Model On the other hand, the number, arrangement, and functional levels of light emitting elements of the slave reproduction apparatus 12C (refer to FIG. 2D) of the third model are different from those of the master reproduction apparatus 11. For example, the light emitting elements L1 and L3 and the light emitting elements L1" and L3" of the master reproduction apparatus 11 are disposed differently, but the light emitting elements L1 and L3 are assigned to the light emitting elements L1" and L3", respectively. This assignment is determined in advance. That is, the light emitting element L1" corresponds to L1, and the light emitting element L3" corresponds to L3. Then, the MCU 12c of the slave reproduction apparatus 12 generates illumination information by associating the data (color values) of the light emission modes of the light emitting elements L1 and L3 with L1" and L3" as brightness values using the above-described Equation 1.

Further, the illumination information is generated such that the light emission modes of the light emitting elements F1 and F2 of the master reproduction apparatus 11 are associated with the light emitting elements F1 and F2 of the slave reproduction apparatus 12 of the third model as they are. Since the slave reproduction apparatus 12 does not have light emitting elements corresponding to the light emitting elements L2 and L4 of the master reproduction apparatus 11, the light emission modes of the light emitting elements L2 and L4 are excluded or neglected.

As described above, the MCU 12c of the slave reproduction apparatus 12C updates the illumination information on the basis of the illumination information received from the master reproduction apparatus 11, and executes the light emission control of the light emitting element on the basis of this.

4.1.4) Summary

The master reproduction apparatus 11 according to the present technology can control light emission individually for each of the light emitting elements on the basis of the illumination information. Further, the slave reproduction apparatus 12 can receive the illumination information and realize light emission according to audio data in synchronization with the master reproduction apparatus 11 on the basis of the illumination information or the updated illumination information.

In particular, even if the number, arrangement, and functional levels of light emitting elements of the slave reproduction apparatus 12 are different from those of the master reproduction apparatus 11, it is possible to realize the light emission of the light emission elements according to the model.

In accordance with the present technology, therefore, it is possible to improve the user's excitement. A plurality of users can share and enjoy music and light indoors and outdoors.

4.2) Embodiment 2

FIG. 6 is a table showing illumination information according to Embodiment 2 generated by the master reproduction apparatus 11. The illumination information includes a pattern number (Pt. No), which defines a light emission pattern associated with each of the light emitting elements L1 to L4, F1, F2, S1, and S2, and a color table (Col-Tbl. No), which defines a color (Color).

The light emission pattern is a light pattern defined in advance for each pattern number. There are several tens to several hundreds of light emission patterns, for example. The light emission pattern defines how to change the color using a color table in the illumination information on the basis of analysis data (information such as a beat based on the analysis data).

The color table is a table showing the range of change in color defined in advance for each color table number. That is, one color table indicates data for changing colors in a range defined by a combination of a plurality of color values (RGB values). One color table defines the color range of the light emission pattern of each light emitting element in the illumination information. For example, one color table defines one or more basic colors and gradation colors or similar colors centered on the basic colors. For example, there are several to dozens of color tables.

The transmission interval of the illumination information by the master reproduction apparatus 11 is a predetermined time unit. The time unit is a time for each timing at which at least one of data items of the light emission modes corresponding to light emitting elements and colors of the illumination information changes. The timing at which at least one of the data items of the light emission modes changes is, for example, a timing at which a beat, a tempo, a rhythm, a key, or the like changes or a timing at which the length of a pattern itself determined by the number of bars changes.

The slave reproduction apparatus 12B of the second model receives the illumination information from the master reproduction apparatus 11. Then, the MCU 12c generates illumination information by assigning the light emission modes of the light emitting elements L1 and L3 of the master reproduction apparatus 11 as light emission modes of its own light emitting elements L1' and L3', thereby controlling the light emission. The light emission modes of the light emitting elements F1 and F2 of the master reproduction apparatus 11 are realized as they are by the light emitting elements F1 and F2 of the slave reproduction apparatus 12.

Further, the MCU 12c of the slave reproduction apparatus 12B of the second model generates illumination information by assigning the light emission modes of the light emitting elements S1 and S2 of the master reproduction apparatus 11 as light emission modes of its own light emitting elements S1' and S2', thereby controlling the light emission. In this case, the MCU 12c converts a plurality of color values in the color table into brightness values using the above-described Equation 1 to realize the light emission modes of the light emitting elements S1' and S2'.

On the other hand, the slave reproduction apparatus 12C of the third model receives the illumination information from the master reproduction apparatus 11. Then, the MCU 12c generates illumination information by assigning the light emission modes of the light emitting elements L1 and L3 of the master reproduction apparatus 11 as light emission modes of its own light emitting elements L1" and L3", thereby controlling the light emission. In this case, the MCU 12c converts a plurality of color values in the color table into brightness values using the above-described Equation 1 to realize the light emission modes of the light emitting elements L1" and L3".

The light emission modes of the light emitting elements F1 and F2 of the master reproduction apparatus 11 are realized as they are by the light emitting elements F1 and F2 of the slave reproduction apparatus 12C.

As described above, in accordance with the present Embodiment 2, the same effect as in the above Embodiment 1 can be obtained. Further, since the illumination information includes the light emission pattern and the color table, more various illuminations can be realized as compared with the above Embodiment 1.

5. Various Other Embodiments

The present technology is not limited to the embodiments described above, and various other embodiments can be realized.

The reproduction system 100 according to the embodiment described above includes a plurality of slave reproduction apparatuses 12A to 12C of three models. However, the reproduction system 100 may include one or more slave reproduction apparatuses 12 of at least one model.

At least one of the slave reproduction apparatuses 12 may include only one light emitting element.

The MCU 12c of each slave reproduction apparatus 12 can also control the light emission using the same illumination information in the flow of the light emitting element of the slave reproduction apparatus 12A, the light emitting element of the slave reproduction apparatus 12B, and the light emitting element of the slave reproduction apparatus 12C. That is, the light emission changes in such a manner that the delay effect is obtained in each slave reproduction apparatus 12. In this case, it is desirable to use the illumination information according to the above Embodiment 2.

The master reproduction apparatus may determine the configuration or specifications of the slave reproduction apparatus when a connection is made by near field communication or other communication means. For example, at the time of the connection, the master reproduction apparatus may compare the number, arrangement, and functional levels of its own light emitting elements with those of the light emitting elements of the slave reproduction apparatus and transmit the comparison information to the slave reproduction apparatus. Therefore, since these reproduction apparatuses do not have to store in advance information of the number or the arrangement of light emitting elements of the other reproduction apparatus to be connected, it is possible to obtain the information at the time of the connection.

The arrangement, number, and functional levels of the light emitting elements of each reproduction apparatus 10 can be appropriately changed in design.

In the embodiments described above, the functional levels of the light emitting elements of the master reproduction apparatus 11 are higher than those of the slave reproduction apparatuses 12B and 12C of the second and third models. However, the functional levels of the light emitting elements of the master reproduction apparatus 11 may be higher than those of the second and third models.

It is also possible to combine at least two features of the features of each embodiment described above.

Note that, the present technology can also adopt the following configuration.

(1) A master reproduction apparatus capable of executing synchronous reproduction of audio data together with one or more slave reproduction apparatuses, the master reproduction apparatus including:

a plurality of light emitting elements;

a generation unit configured to generate illumination information, in which light emission modes are associated with the plurality of light emitting elements, on the basis of analysis data obtained by analyzing audio data;

a transmission unit configured to transmit the generated illumination information to the one or more slave reproduction apparatuses; and a light emission control unit configured to cause the plurality of light emitting elements to emit light in the light emission modes based on the illumination information.

(2) The master reproduction apparatus according to the above (1), in which the slave reproduction apparatus has at least one light emitting element, a light emission control command generation unit configured to generate a light emission control command for synchronizing light emission by the plurality of light emitting elements with light emission by the light emitting element of the slave reproduction apparatus is further provided, and the transmission unit is configured to transmit the generated light emission control command to the slave reproduction apparatus.

(3) The master reproduction apparatus according to the above (1) or (2), in which at least one of the one or more slave reproduction apparatuses is a heterogeneous slave reproduction apparatus having one or more light emitting elements configured to differ in at least one of the number, arrangement, or functional levels of the plurality of light emitting elements of the master reproducing apparatus, and the transmission unit is configured to transmit the illumination information to the heterogeneous slave reproduction apparatus.

(4) The master reproduction apparatus according to any one of the above (1) to (3), in which the generation unit is configured to generate illumination information, in which a color value is associated with a first light emitting element among the plurality of light emitting elements and a brightness value is associated with a second light emitting element, as the light emission mode of the illumination information.

(5) The master reproduction apparatus according to any one of the above (1) to (3), in which the generation unit is configured to generate illumination information, which includes a light emission pattern associated with each of the plurality of light emitting elements and a color table defining a combination of a plurality of color values, as the light emission mode of the illumination information.

(6) The master reproduction apparatus according to the above (5), in which the generation unit is configured to generate illumination information in which a color range of the light emission pattern according to the light emission pattern is defined by a combination of the plurality of color values defined by the color table.

(7) A slave reproduction apparatus capable of executing synchronous reproduction of audio data together with a master reproduction apparatus, the slave reproduction apparatus including:

one or more light emitting elements;

a reception unit configured to receive audio data and illumination information, which is illumination information generated by the master reproduction apparatus having a plurality of light emitting elements and generated on the basis of analysis data of the audio data and in which light emission modes are associated with the plurality of light emitting elements, from the master reproduction apparatus; and a light emission control unit configured to cause the one or more light emitting elements to emit light on the basis of the received illumination information.

(8) The slave reproduction apparatus according to the above (7), in which the reception unit is configured to receive a light emission control command transmitted from the master reproduction apparatus, the light emission control command being for synchronizing light emission by the plurality of light emitting elements with light emission by the light emitting elements of the slave reproduction apparatus.

(9) The slave reproduction apparatus according to the above (7) or (8), in which at least one of the number or arrangement of the one or more light emitting elements is different from that of the plurality of light emitting elements of the master reproduction apparatus.

(10) The slave reproduction apparatus according to any one of the above (7) to (9), in which a functional level of at least one of the one or more light emitting elements is different from a functional level of at least one light emitting element corresponding in advance among the plurality of light emitting elements of the master reproduction apparatus.

(11) The slave reproduction apparatus according to the above (10), in which the master reproduction apparatus is configured to generate illumination information, in which information including a color value is associated with at least one of the plurality of light emitting elements, as the light emission mode of the illumination information, and the light emission control unit is configured to convert the color value using a predetermined algorithm to cause at least one of the one or more light emitting elements to emit light.

(12) The slave reproduction apparatus according to the above (11), in which the light emission control unit is configured to convert the color value into a brightness value.

(13) A light emission method by a master reproduction apparatus capable of executing synchronous reproduction of audio data together with one or more slave reproduction apparatuses, the method including:

analyzing audio data to acquire analysis data;

generating illumination information, in which light emission modes are associated with a plurality of light emitting elements provided in the master reproduction apparatus, on the basis of the acquired analysis data;

transmitting the generated illumination information to the one or more slave reproduction apparatuses; and causing the plurality of light emitting elements to emit light in the light emission modes based on the illumination information.

(14) A light emission method by a slave reproduction apparatus capable of executing synchronous reproduction of audio data together with a master reproduction apparatus, the method including:

receiving audio data and illumination information, which is illumination information generated by the master reproduction apparatus having a plurality of light emitting elements and generated on the basis of analysis data of the audio data and in which light emission modes are associated with the plurality of light emitting elements, from the master reproduction apparatus; and causing one or more light emitting elements provided in the slave reproduction apparatus to emit light on the basis of the received illumination information.

(15) The light emission method according to the above (14), in which a functional level of at least one of the one or more light emitting elements is different from functional levels of the plurality of light emitting elements of the master reproduction apparatus, the master reproduction apparatus is configured to generate illumination information, in which information including a color value is associated with at least one of the plurality of light emitting elements, as the light emission mode of the illumination information, and in light emission of the one or more light emitting elements, the color value is converted using a predetermined algorithm to cause at least one of the one or more light emitting elements to emit light.

REFERENCE SIGNS LIST 10 reproduction apparatus
11a, 12a BTM
11b, 12b DSP
11c, 12c MCU
11 master reproduction apparatus
12 slave reproduction apparatus
12A slave reproduction apparatus of first model
12B slave reproduction apparatus of second model
12C slave reproduction apparatus of third model
14 speaker unit
16 light emitting device
L1, L2, L3, L4, F1, F2, S1, S2, L1', L3', L1", L3" light emitting element

The invention claimed is:

1. A master reproduction apparatus capable of executing synchronous reproduction of audio data together with at least one slave reproduction apparatus, the master reproduction apparatus comprising:
  a plurality of light emitting elements;
  a generation unit configured to generate illumination information, in which light emission modes are associated with the plurality of light emitting elements, based on analysis data obtained by analyzing audio data, wherein the analysis data includes at least one of a beat, a tempo, or a rhythm of the audio data, wherein the illumination information includes a light emission pattern associated with each of the plurality of light emitting elements and a color table that defines a combination of a plurality of color values, as the light emission modes of the illumination information, and
  a color range of the light emission pattern is based on the combination of the plurality of color values defined by the color table;
  a transmission unit configured to transmit the generated illumination information to the at least one slave reproduction apparatus; and
  a light emission control unit configured to control the plurality of light emitting elements to emit light in the light emission modes based on the illumination information.

2. The master reproduction apparatus according to claim 1, further comprising
  a light emission control command generation unit configured to generate a light emission control command for synchronizing light emission by the plurality of light emitting elements with light emission by a first light emitting element of the at least one slave reproduction apparatus, wherein the transmission unit is further configured to transmit the generated light emission control command to the at least one slave reproduction apparatus.

3. The master reproduction apparatus according to claim 1, wherein
a first slave reproduction apparatus of the at least one slave reproduction apparatus is a heterogeneous slave reproduction apparatus that includes at least one light emitting element different in at least one of a number, an arrangement, or functional levels of the plurality of light emitting elements of the master reproduction apparatus, and the transmission unit is further configured to transmit the illumination information to the heterogeneous slave reproduction apparatus.

4. The master reproduction apparatus according to claim 1, wherein
the generation unit is further configured to generate illumination information, in which a color value is associated with a first light emitting element among the plurality of light emitting elements and a brightness value is associated with a second light emitting element among the plurality of light emitting elements, as the light emission modes of the illumination information.

5. A slave reproduction apparatus capable of executing synchronous reproduction of audio data together with a master reproduction apparatus, the slave reproduction apparatus comprising:
a first plurality of light emitting elements;
a reception unit configured to receive audio data and color information from the master reproduction apparatus having a second plurality of light emitting elements, wherein
the color information includes color values of light emission modes of the second plurality of light emitting elements, and
at least one of a number or an arrangement of the first plurality of light emitting elements is different from the second plurality of light emitting elements of the master reproduction apparatus; and
a light emission control unit configured to:
determine light emission modes of the first plurality of light emitting elements based on the color values of the light emission modes of the second plurality of light emitting elements;
generate illumination information based on the determined light emission modes of the first plurality of light emitting elements, wherein
the illumination information includes a color value associated with a light emitting element of the first plurality of light emitting elements as the light emission modes of the illumination information;
convert the color value into a brightness value based on a specific algorithm; and
control the first plurality of light emitting elements to emit light based on the illumination information and the brightness value.

6. The slave reproduction apparatus according to claim 5, wherein
the reception unit is further configured to receive a light emission control command transmitted from the master reproduction apparatus, the light emission control command being for synchronizing light emission by the second plurality of light emitting elements with light emission by the first plurality of light emitting elements of the slave reproduction apparatus.

7. The slave reproduction apparatus according to claim 5, wherein a functional level of the first light emitting element of the first plurality of light emitting elements is different from a functional level of at least one light emitting element among the second plurality of light emitting elements of the master reproduction apparatus.

8. The slave reproduction apparatus according to claim 5, wherein
the reception unit is further configured to receive arrangement correspondence information from the master reproduction apparatus, wherein the arrangement correspondence information includes an arrangement of the first plurality of light emitting elements associated with an arrangement of the second plurality of light emitting elements of the master reproduction apparatus.

9. A light emission method by a master reproduction apparatus capable of executing synchronous reproduction of audio data together with at least one slave reproduction apparatus, the method comprising:
analyzing audio data to acquire analysis data;
generating illumination information, in which light emission modes are associated with a plurality of light emitting elements provided in the master reproduction apparatus, based on the acquired analysis data, wherein the analysis data includes at least one of a beat, a tempo, a rhythm of the audio data, wherein
the illumination information includes a light emission pattern associated with each of the plurality of light emitting elements and a color table that defines a combination of a plurality of color values, as the light emission modes of the illumination information, and
a color range of the light emission pattern is based on the combination of the plurality of color values defined by the color table;
transmitting the generated illumination information to the at least one slave reproduction apparatus; and
controlling the plurality of light emitting elements to emit light in the light emission modes based on the illumination information.

10. A light emission method by a slave reproduction apparatus capable of executing synchronous reproduction of audio data together with a master reproduction apparatus, the method comprising:
receiving audio data and color information from the master reproduction apparatus having a second plurality of light emitting elements, wherein the color information includes color values of light emission modes of the second plurality of light emitting elements, and
at least one of a number or an arrangement of a first plurality of light emitting elements of the slave reproduction apparatus is different from the second plurality of light emitting elements of the master reproduction apparatus; and
determining light emission modes of the first plurality of light emitting elements based on the color values of the light emission modes of the second plurality of light emitting elements;
generating illumination information based on the determined light emission modes of the first plurality of light emitting elements, wherein
the illumination information includes a color value associated with a light emitting element of the first plurality of light emitting elements as the light emission modes of the illumination information;
converting the color value into a brightness value based on a specific algorithm; and controlling the first plurality of light emitting elements provided in the slave reproduction apparatus to emit light based on the illumination information and the brightness value.

* * * * *